(12) United States Patent
Kemp et al.

(10) Patent No.: US 10,031,397 B2
(45) Date of Patent: *Jul. 24, 2018

(54) METHOD AND CONTROLLER FOR OPERATING A VARIABLE OPTICAL RETARDER AND AN ARRAY

(71) Applicant: Lumentum Operations LLC, Milpitas, CA (US)

(72) Inventors: Josh P. Kemp, Kanata (CA); Sheldon McLaughlin, Ottawa (CA); Thomas Friessnegg, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,081

(22) Filed: Jan. 23, 2017

(65) Prior Publication Data

US 2017/0131616 A1  May 11, 2017

Related U.S. Application Data

(63) Continuation of application No. 13/933,317, filed on Jul. 2, 2013, now Pat. No. 9,551,900.

(51) Int. Cl.
  *G02F 1/31* (2006.01)
  *G02B 6/35* (2006.01)
  *G02B 6/293* (2006.01)

(52) U.S. Cl.
  CPC .......... *G02F 1/31* (2013.01); *G02B 6/29313* (2013.01); *G02B 6/29395* (2013.01); *G02B 6/3534* (2013.01); *G02B 6/3586* (2013.01); *G02F 2201/307* (2013.01); *G02F 2203/05* (2013.01)

(58) Field of Classification Search
  CPC ...... G02F 1/13363; G02F 1/292; G02F 1/293; G02B 6/3534; G02B 6/3586; G02B 6/29395

See application file for complete search history.

(56) References Cited

U.S. PATENT DOCUMENTS

| 5,485,173 | A | 1/1996 | Scheffer et al. |
|---|---|---|---|
| 5,852,429 | A | 12/1998 | Scheffer et al. |
| 6,094,187 | A | 7/2000 | Jones |
| 6,498,872 | B2 | 12/2002 | Bouevitch et al. |
| 6,810,169 | B2 | 10/2004 | Bouevitch |
| 6,859,573 | B2 | 2/2005 | Bouevitch et al. |
| 7,092,599 | B2 | 8/2006 | Frisken |
| 7,184,665 | B2 | 2/2007 | Morozov |
| 7,457,547 | B2 | 11/2008 | Frisken et al. |
| 7,499,065 | B2 | 3/2009 | Richards |
| 8,279,138 | B1 | 10/2012 | Margulis |

(Continued)

FOREIGN PATENT DOCUMENTS

EP  1126294  8/2001

*Primary Examiner* — Dung Nguyen
(74) *Attorney, Agent, or Firm* — Harrity & Harrity, LLP

(57) ABSTRACT

A method and a controller for operating an array of variable optical retarders are disclosed. Neighboring pixels of the array of variable optical retarders are driven with disordered temporal bit sequences. An optical beam illuminating the pixels tends to integrate time-domain modulation caused by individual pixels driven in a non-coordinated or disordered fashion, which reduces the overall time-domain modulation amplitude of the optical beam.

20 Claims, 12 Drawing Sheets

(56) References Cited

U.S. PATENT DOCUMENTS

| | | |
|---|---|---|
| 8,854,597 B2 | 10/2014 | Sharma |
| 9,551,900 B2 * | 1/2017 | Kemp ................. G02F 1/13363 |
| 2003/0021526 A1 | 1/2003 | Bouevitch |
| 2006/0139378 A1 | 6/2006 | Hon et al. |
| 2009/0122054 A1 | 5/2009 | Lee et al. |
| 2012/0236216 A1 | 9/2012 | Sharma et al. |
| 2012/0328291 A1 | 12/2012 | Frisken et al. |

* cited by examiner

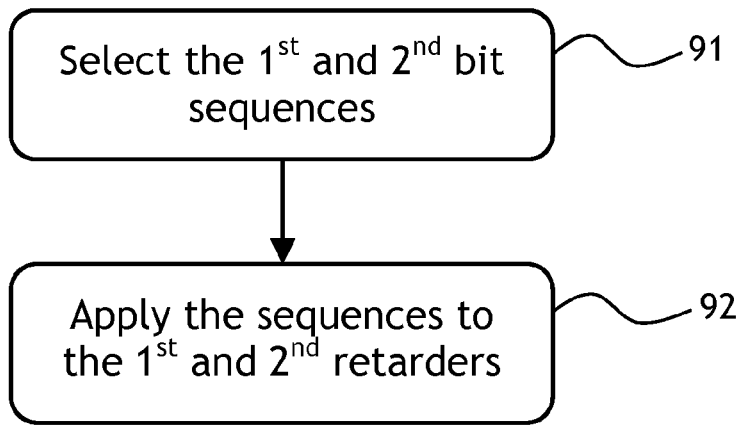
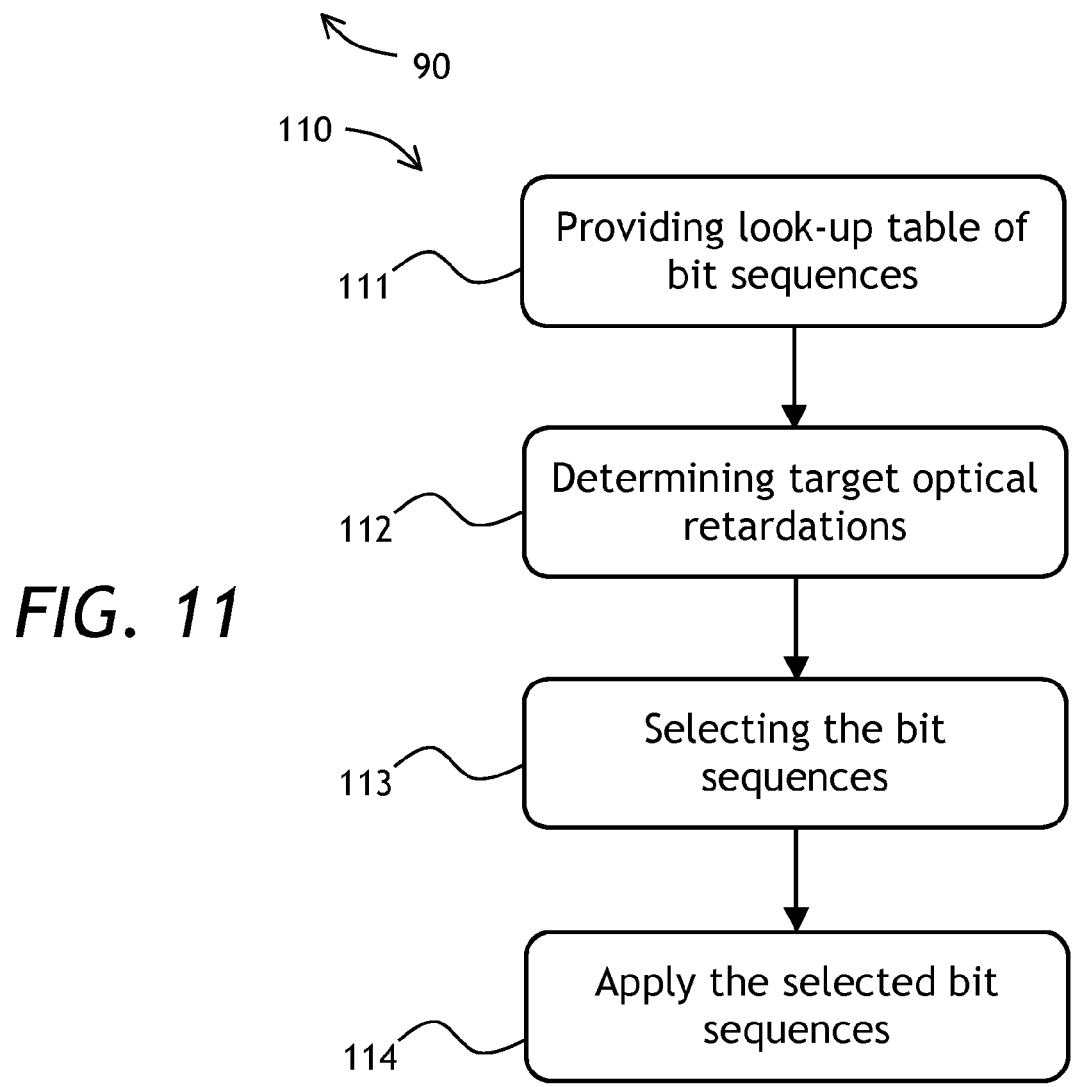
FIG. 9
FIG. 11

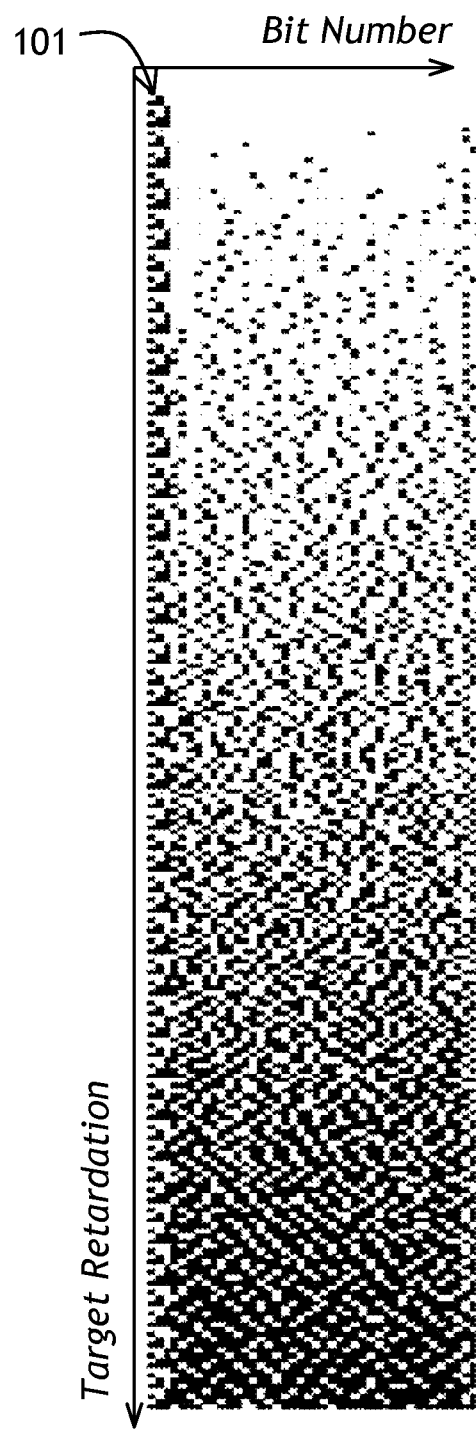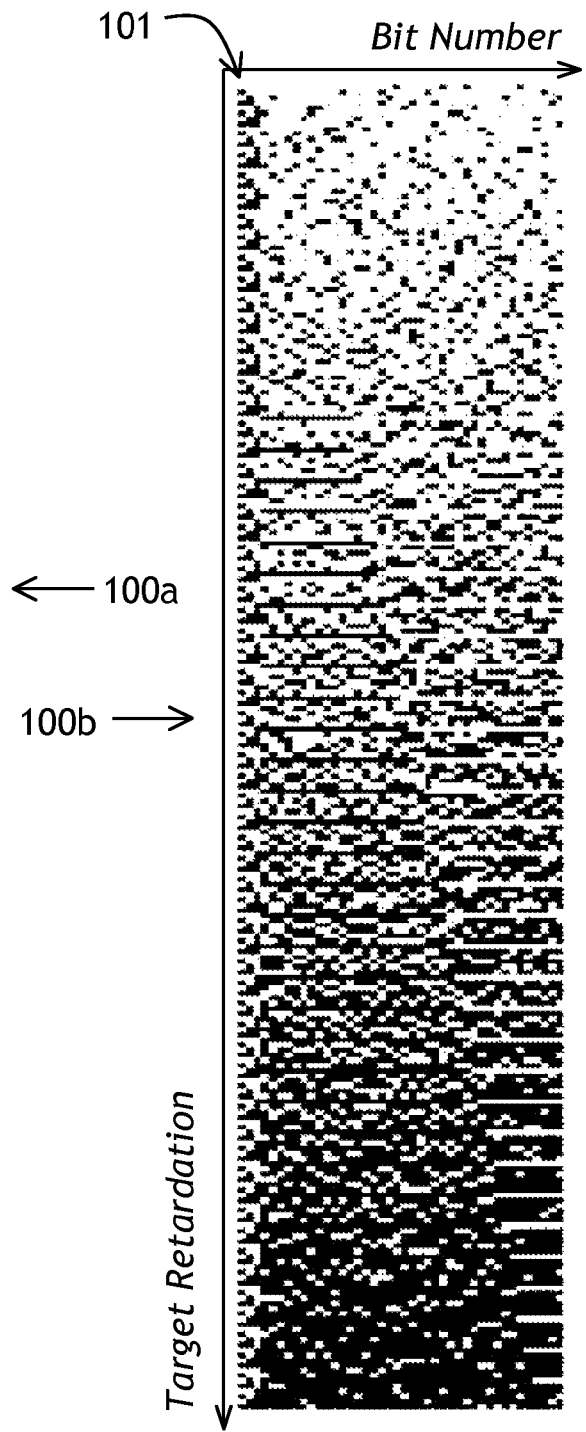
FIG. 10A                    FIG. 10B

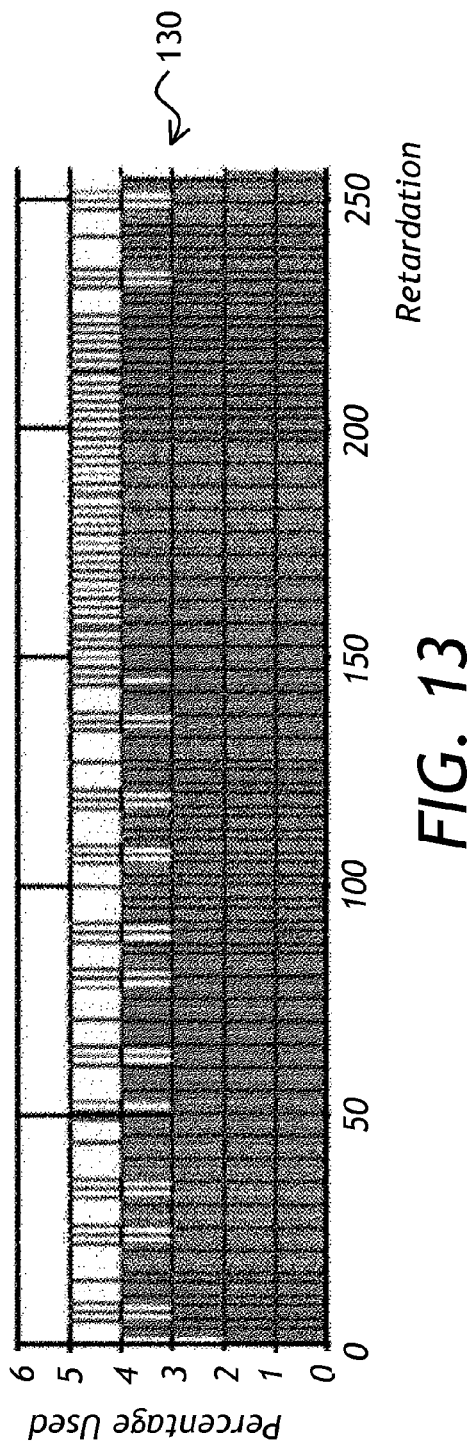
FIG. 13
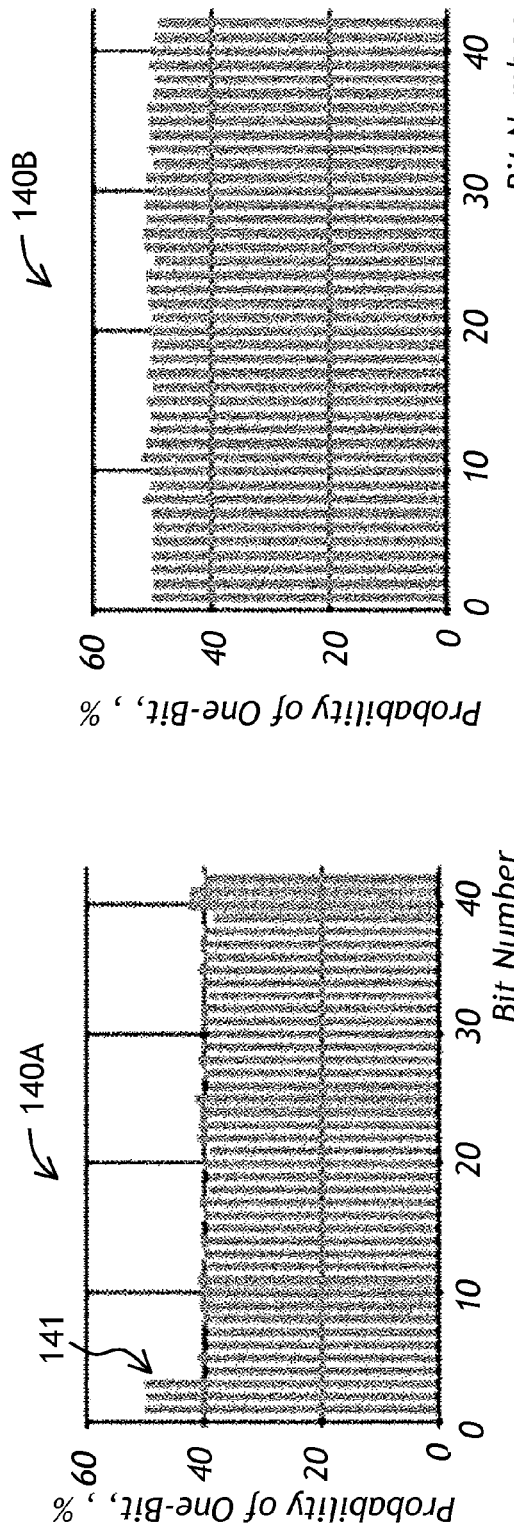
FIG. 14A
FIG. 14B

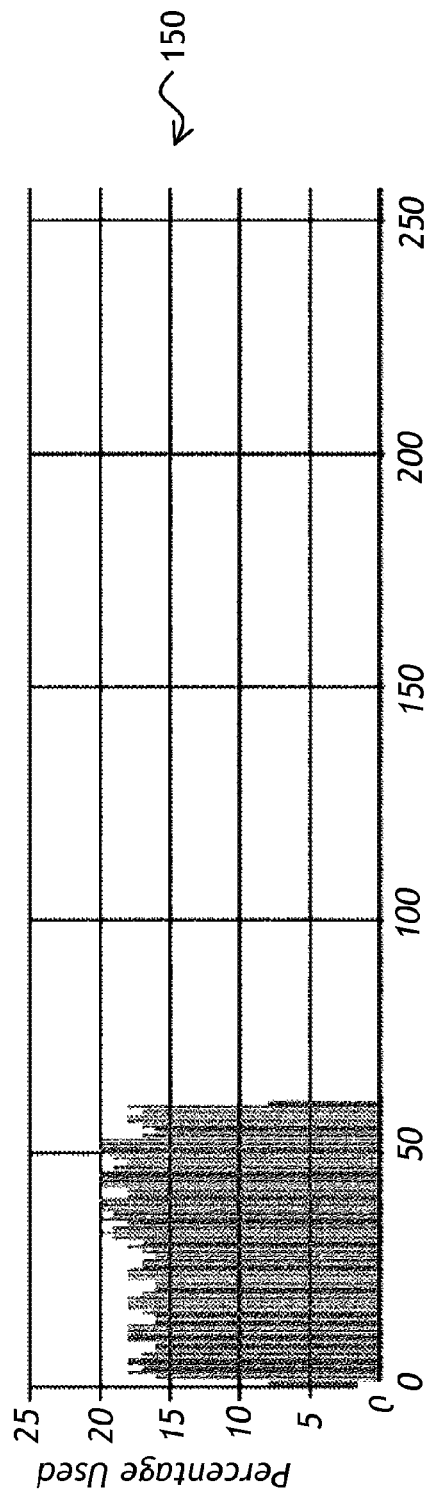
FIG. 15
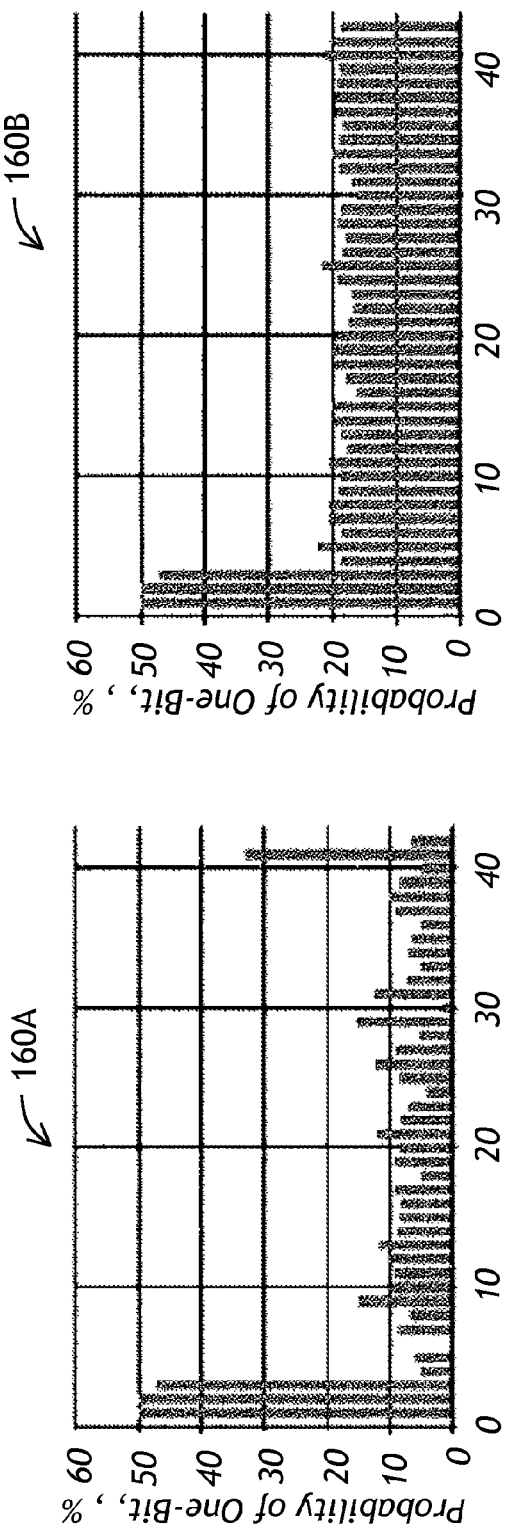
FIG. 16A
FIG. 16B

METHOD AND CONTROLLER FOR OPERATING A VARIABLE OPTICAL RETARDER AND AN ARRAY

RELATED APPLICATION

This application is a continuation of U.S. application Ser. No. 13/933,317, filed Jul. 2, 2013 (now U.S. Pat. No. 9,551,900), the disclosure of which is incorporated herein by reference.

TECHNICAL FIELD

The present invention relates to optical retarder devices, and in particular to devices and methods for operating variable optical retarders and arrays thereof.

BACKGROUND OF THE INVENTION

Variable optical retarders are used to manipulate polarization and phase properties of optical beams. Liquid crystal materials are frequently used for this purpose due to large electro-optical coefficients of liquid crystal fluids. In a liquid crystal variable optical retarder, a voltage is applied to a thin layer of a liquid crystal fluid comprised of oriented liquid crystal molecules. The molecules align relative to the electric field due to induced electrical dipole interaction with an electric field of the applied voltage, changing effective refractive index of the liquid crystal layer and thus changing a delay or phase of a polarized light beam propagating through the layer. When the light beam propagates through a two-dimensional array of such liquid crystal variable optical retarders, the spatial polarization or phase distribution of the light beam changes in accordance with distribution of individual voltages applied to individual retarders of the array.

Although liquid crystal arrays have been originally developed primarily for information displays, they have been finding a steadily increasing use in optical networking equipment, such as dynamic gain equalizers for equalizing spectral gain of optical amplifiers, wavelength blockers for selective blocking wavelength channels and, more recently, in wavelength selective optical switches (WSS). WSS operate to independently switch individual wavelength channels between different fibers of fiberoptic communications networks.

Frisken in U.S. Pat. No. 7,092,599 discloses a wavelength selective switch having a liquid crystal array as a switching element. The liquid crystal array is driven by AC voltages of different phases and frequencies, for example, 1 kHz, 2 kHz, 4 kHz, and 8 kHz, applied directly to different row and column electrodes of the liquid crystal (LC) array. One drawback of directly driven liquid crystal arrays is a reduced number of optical retardation levels (called "grayscale levels" in information display industry), and a relatively slow response of the LC fluid. The slow response of the LC fluid is required to avoid time domain modulation, or flicker, due to the multi-frequency AC modulation used to generate the grayscale levels.

Active matrix liquid crystal arrays allow for faster operation, with more optical retardation levels attainable. In an analog active matrix liquid crystal array, a dedicated electrical switch or gate element is connected to, and disposed next to, each optical retarder element of the array. The gate element can be opened by applying an external gate voltage to a gate bus electrode, which allows the liquid crystal retarder to store an electric charge when a corresponding signal voltage is simultaneously applied to a signal bus electrode crossing the gate electrode at the gate element's location. The stored electrical charge generates a constant voltage across the retarder element, defining its optical retardation value until next data writing sequence.

Among different active matrix liquid crystal array implementations, reflective liquid crystal arrays disposed on a silicon substrate ("Liquid Crystal on Silicon" or LCoS) are of a particular interest. The advantage of LCoS arrays is that the gate elements and/or other driver circuitry can be conveniently disposed on the silicon substrate behind the liquid crystal layer, resulting in a large fill factor of the LCoS arrays, of about 90%. This makes LCoS arrays promising switching elements for WSS applications.

Frisken et al. in U.S. Pat. No. 7,457,547 disclose a LCoS-based WSS device. Referring to FIG. 1, a LCoS-based WSS 10 includes an input port 12, wavelength dispersing an collimating optics shown as a dashed rectangle 14, a LCoS array 16, and a plurality of output ports 18. The LCoS array 16 includes a silicon substrate 20 having thereon some driving circuitry, not shown, pixel electrodes 22, a liquid crystal layer 24, and a Indium Tin Oxide (ITO) transparent backplane common electrode 26. In operation, the LCoS array 16 is driven by applying analog voltages to the individual pixel electrodes 22, to create a saw tooth optical retardation profile 28, which acts as a reflective phase diffraction grating, in which the periodicity of the grating determines the steering angle, and the height h of the profile the amount of power that is coupled into the first diffraction order. The saw tooth optical retardation profile 28, defining a corresponding linear optical retardation profile 29, has a property of steering a reflected optical beam 32 to one of the output ports 18, depending on the periodicity and a slope α of the saw tooth profile 28. The LCoS array 16 is driven to vary the periodicity and/or the slope α of the saw tooth optical retardation profile 28, which causes the reflected optical beam 32 to steer in space and to couple into a desired one of the output ports 18. Detrimentally, when the saw tooth profile 28 ceases to be linear due to local variations of optical retardation, aging, or temperature change, a time domain modulation (TDM) of the reflected wavelength channel optical beam 32 can occur upon coupling of the reflected optical beam 32 into the output port 18. This happens because a non-linear saw tooth profile causes an extra optical loss and, at a higher optical loss, TDM sensitivity typically increases.

Liquid crystal arrays can also be operated by applying a binary level voltage of a varying duty cycle to the liquid crystal layer. The modulation period of the binary level voltage is typically selected to be smaller than a response time of the liquid crystal layer, which then tends to integrate the applied voltage, reacting to a net voltage proportional to the duty cycle. This driving method of liquid crystal arrays is commonly referred to as "digital driving". The digital driving, when implemented in LCoS arrays, has advantages of simplified driver circuitry, improved switching speed, and ability to control larger number of optical retarders, or pixels, in comparison with other types of liquid crystal arrays.

The above advantages of digitally driven LCoS arrays can make them highly desirable for WSS applications. However, the above mentioned TDM problem gets even worse in a digitally driven LCoS-WSS than in the analog-driven WSS device 10 described above. In a digitally driven LCoS-WSS, a driving frame rate component of TDM can be quite strong, which, while tolerable in some information display applications, can be highly detrimental in WSS applications requiring stable, controllable, and time-invariant optical throughput. Increasing the response time of the liquid crystal layer 24 can help one to alleviate the problem, but slower LC fluid increases the switching time of the WSS beyond acceptable limits, negating one of the key advantages of the digital driving.

SUMMARY OF THE INVENTION

It is a goal of the invention to provide a method and a controller for digitally driving an optical retarder and array of such retarders so that TDM is lessened, facilitating use of digitally-driven variable optical retarders and their arrays in optical networking devices and applications.

According to an embodiment of the invention, neighboring pixels of an array of variable optical retarders are driven with temporal bit sequences that are substantially evenly distributed in time, while being generally uncorrelated with each other. The optical beam illuminating the pixels tends to integrate the TDM caused by individual pixels driven in the non-coordinated or disordered fashion, which reduces the overall TDM amplitude of the optical beam. Inter-pixel liquid crystal orientations, caused by fringing electric fields at boundaries between neighboring retarders driven with disordered bit sequences, can enhance this smoothing effect even further. The TDM reduction effect is somewhat analogous to reducing vibration of a bridge when a group of soldiers walk across the bridge in a non-coordinated way, as opposed to the soldiers marching across the bridge in sync.

In accordance with the invention, there is provided a method of operating an array of variable optical retarders including first and second adjacent retarders, the method comprising:

(a) selecting first and second temporal bit sequences of equal total duration for application to the first and second retarders, respectively, for obtaining first and second values of optical retardation therein, respectively; and (b) simultaneously applying the first and second bit sequences to the first and second retarders, respectively, to generate a spatial profile of an optical retardation in an optical beam illuminating both the first and the second retarders, in response to net amplitudes of the first and second bit sequences, respectively;

wherein in step (b), one-bits in the first and second temporal bit sequences are substantially evenly distributed in time and are generally uncorrelated with each other, for lessening a time-domain modulation of the optical beam.

In accordance with the invention, there is further provided a method of operating a two-dimensional array of liquid crystal variable optical retarders in an optical device comprising input and output ports, the method comprising:

(i) providing a look-up table defining at least one temporal bit sequence for each one of a plurality of pre-determined optical retardation values;

(ii) determining target optical retardation values for the optical retarders of the array illuminated by an optical beam coupled to the input port, for coupling the optical beam into the output port;

(iii) consulting the look-up table of step (i) to select the temporal bit sequences to be applied to the optical retarders of the array, to provide the target optical retardation values of step (ii); and (iv) simultaneously applying the temporal bit sequences determined in step (iii) to the optical retarders of the array, so as to couple the optical beam into the output port;

wherein in step (iv), one-bits in the temporal bit sequences selected in step (iii) are substantially evenly distributed in time and across the optical retarders of the array illuminated by the optical beam, for lessening a time-domain modulation of the optical beam coupled into the output port.

In accordance with an aspect of the invention, there is further provided a method of operating a variable optical retarder for providing an optical retardation in response to a net amplitude of a pulse width modulated binary signal having ON time equal to M cycles and a modulation period equal to N cycles, wherein M<N, the method comprising (A) splitting the modulated binary signal into M ON sub-signals of a single-cycle duration; and (B) evenly and non-periodically spreading the M ON sub-signals of step (A) across the modulation period.

In accordance with yet another aspect of the invention, there is further provided a controller for operating a two-dimensional array of liquid crystal variable optical retarders in an optical device comprising input and output ports, wherein the controller is suitably programmed for:

(i) providing a look-up table including at least one temporal bit sequence for each one of a plurality of pre-determined optical retardation values of an optical retarder of the array when the at least one temporal bit sequence is applied to the optical retarder;

(ii) determining target optical retardation values for the optical retarders of the array illuminated by an optical beam coupled to the input port, for coupling the optical beam into the output port;

(iii) consulting the look-up table of step (i) to select the temporal bit sequences to be applied to the optical retarders of the array, to provide the target optical retardation values of step (ii); and (iv) simultaneously applying the temporal bit sequences determined in step (iii) to the optical retarders of the array, so as to couple the optical beam into the output port;

wherein in step (iv), one-bits in the temporal bit sequences selected in step (iii) are substantially evenly distributed in time and across the optical retarders of the array illuminated by the optical beam, for lessening a time-domain modulation of the optical beam coupled into the output port.

Preferably, a total number of one-bits in a 5×5 bit rectangle centered on a particular bit of a particular row of the look-up table varies by X≤3 bits in going from one bit of the particular row to another bit of the particular row, for Y≥50% of all bits of the particular row.

BRIEF DESCRIPTION OF THE DRAWINGS

Exemplary embodiments will now be described in conjunction with the drawings, in which:

FIG. 9 is a flow chart of a method of operating the array of FIG. 7;

FIGS. 10A and 10B are look-up tables for operating the array of FIG. 7;

FIG. 11 is a flow chart of a method of operating the array of FIG. 7 using one of the look-up tables of FIGS. 10A and 10B;

FIG. 13 is a graph of percentage of using various retardation values for zero attenuation of the output signal in the WSS of FIG. 7;

FIGS. 14A and 14B are graphs of probability of one-bits vs. bit number for the percentage graph of FIG. 13 when using various target retardation values of the look-up tables of FIGS. 10A and 10B, respectively;

FIG. 15 is a graph of percentage of using various retardation values for 6 dB attenuation of the output signal in the WSS of FIG. 7;

FIGS. 16A and 16B are graphs of probability of one-bits vs. bit number for the percentage graph of FIG. 15 when using various target retardation values of the look-up tables of FIGS. 10A and 10B, respectively;

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1:
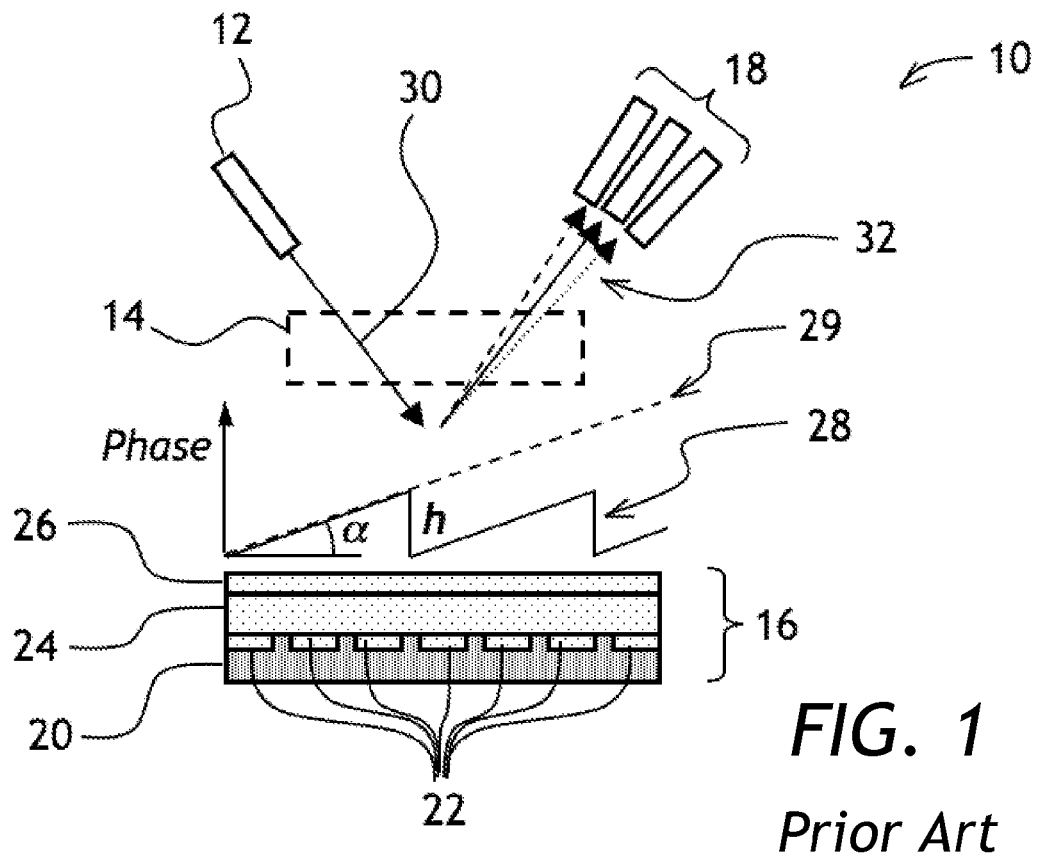
FIG. 1 is a schematic view of a prior-art LCoS WSS.
Figure 2:
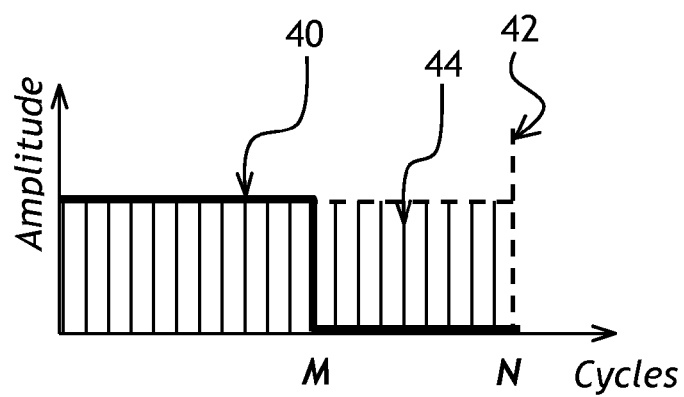
FIG. 2 is a time trace of a modulated binary driving signal applied to a variable optical retarder.
Figure 3:
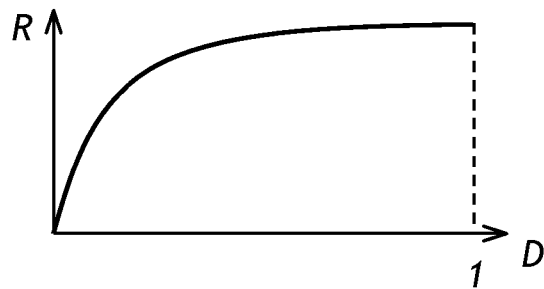
FIG. 3 is a plot of optical retardation vs. duty cycle of the modulated binary driving signal of FIG. 2.
Figure 4A:
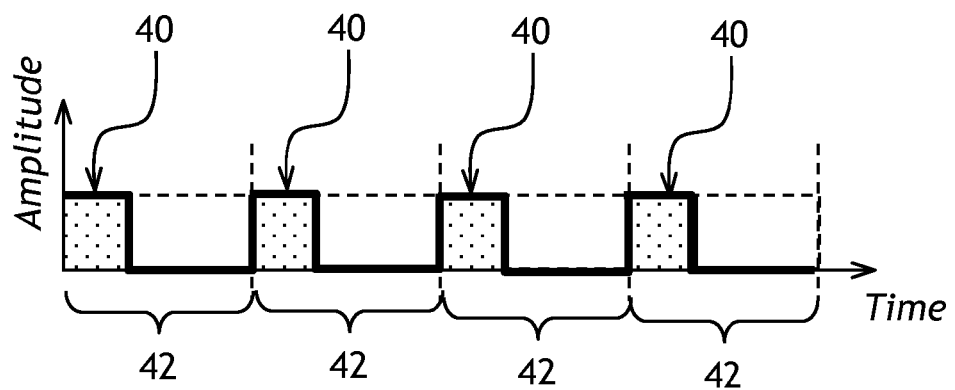
FIGS. 4A and 4B are time traces of four periods of the modulated binary driving signal of FIG. 2 and resulting TDM, respectively.

Referring to FIGS. 2 and 4A, a modulated binary signal 40, shown with a thick solid line, has a modulation period 42 having N cycles 44 of an internal clock, not shown. The modulated binary signal 40 has ON time equal to M cycles, wherein M≤N. The duty cycle D=M/N. The greater the value of the duty cycle D, the longer time a liquid crystal variable retarder, not shown, is subjected to the full amplitude of the signal 40. Referring to FIG. 3, the optical retardation R of the retarder monotonically increases with the duty cycle D, gradually leveling out at the duty cycle D approaching the value of one.

Figure 4B:
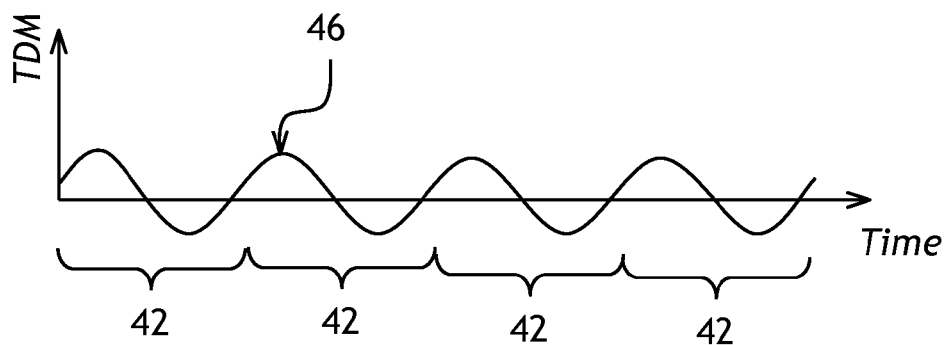

Referring now to FIG. 4B with further reference to FIG. 4A, the periodicity of the modulated binary signal 40 causes TDM 46 of an output coupled signal to appear. As seen in FIG. 4B, the TDM 46 has the periodicity of the modulated binary signal 40.

Figure 5A:
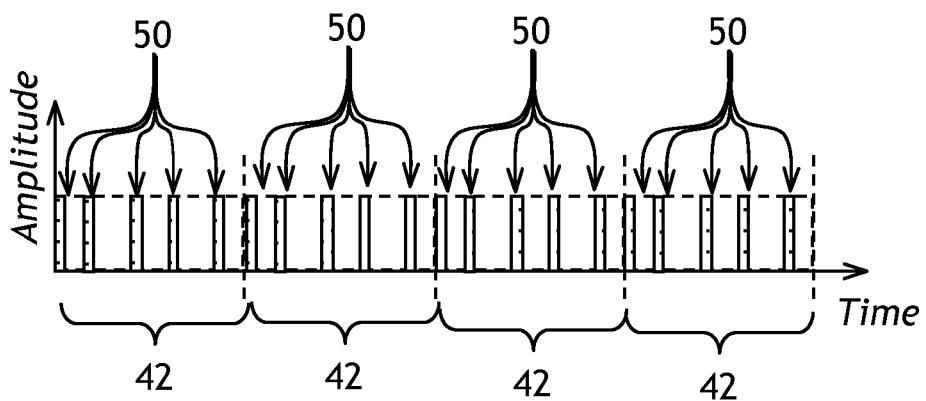
FIGS. 5A and 5B are time traces of distributed binary driving pulses according to the invention and a resulting TDM, respectively.
Figure 5B:
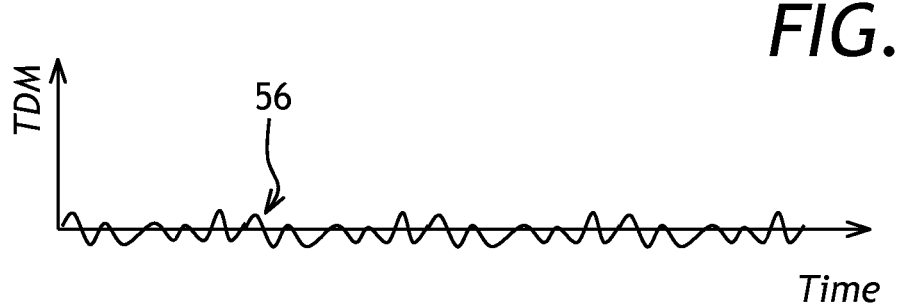

Turning to FIG. 5A with further reference to FIG. 4A, the modulated binary signal 40 is split into M ON sub-signals 50 of a single-cycle duration. In FIG. 5A, the M ON sub-signals 50 are evenly and non-periodically spread across the modulation period 42, resulting in TDM reduction. Referring now to FIG. 5B with further reference to FIG. 4B, TDM 56 in FIG. 5B is reduced as compared to the TDM 46 of FIG. 4B, due to the spreading of the M ON sub-signals 50 across the modulation period 42, while the net amplitude and the overall duty cycle of the modulated binary signal 40 and the M ON sub-signals 50 remain the same. Accordingly, the retardation caused by the M ON sub-signals 50 is similar to the retardation caused by the modulated binary signal 40 of FIG. 4A. The two values of retardation may not be exactly equal to each other when ON and OFF response times of the optical retarders are not equal to each other.

Figure 6:
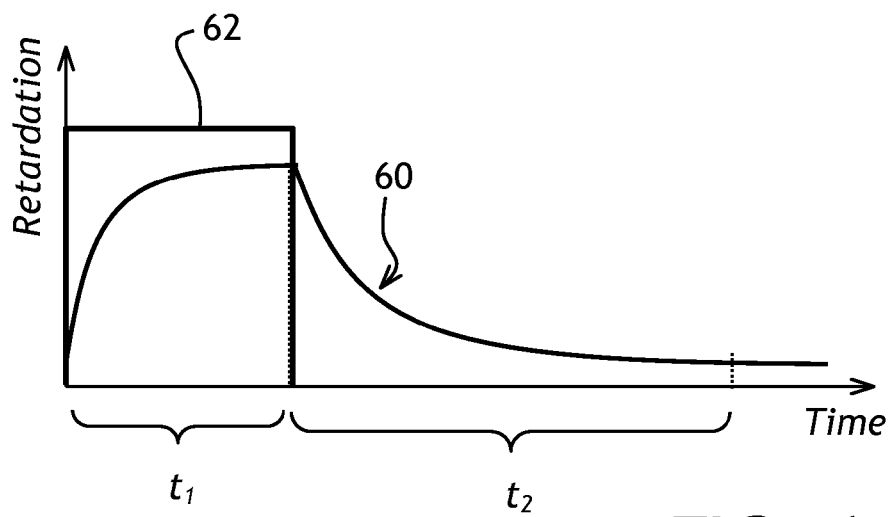
FIG. 6 is a time trace of a response of a liquid crystal layer's retardation to a square driving pulse.

The amount of retardation can vary somewhat depending on the relative position of the M ON sub-signals 50. This phenomenon is at least partially due to a difference between ON and OFF response times of a typical nematic liquid crystal fluid. Referring to FIG. 6, a retardation response 60 of a liquid crystal fluid to a square driving pulse 62 includes an ON time $t_1$, which is typically smaller than an OFF time $t_2$. This behaviour of liquid crystals can be taken into account during calibration of the retardation vs. predetermined set of patterns of the M ON sub-signals 50. It can be beneficial, because it can increase the number of achievable retardation values beyond N, that is, beyond the number of cycles in the modulation period 42.

Figure 7:
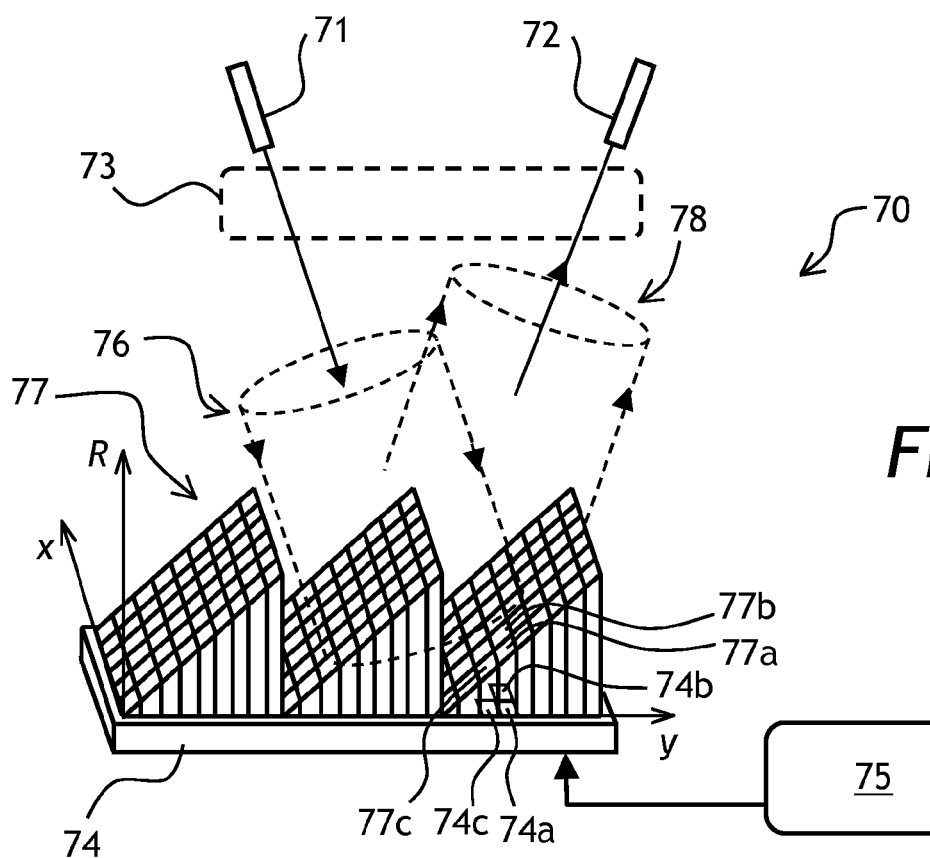
FIG. 7 is a schematic view of a WSS having an array of digitally-driven variable optical retarders.

Referring to FIG. 7 with further reference to FIG. 5A, a wavelength-selective optical switch 70 of the invention includes input and output ports 71 and 72, respectively, wavelength-dispersing and collimating optics represented by a dashed rectangle 73, a two-dimensional array 74 of liquid crystal variable optical retarders including first 74a, second 74b, and third 74c retarders, and a controller 75 for controlling the array 74. In operation, an incoming wavelength channel optical beam 76 is spread over a plurality of individual retarders of the array 74. The controller 75 sends a modulated binary signal including ON sub-signals 50 to individual retarders, e.g. the first 74a, the second 74b, and the third 74c retarders of the array 74, to form a saw tooth two-dimensional optical retardation pattern 77 including individual retardation values 77a, 77b, and 77c, respectively. As a result, the saw tooth pattern 77 is created, incoming wavelength channel optical beam 76 is reflected by the array 74 forming a reflected wavelength channel optical beam 78 directed to the output port 72.

Figure 8A:
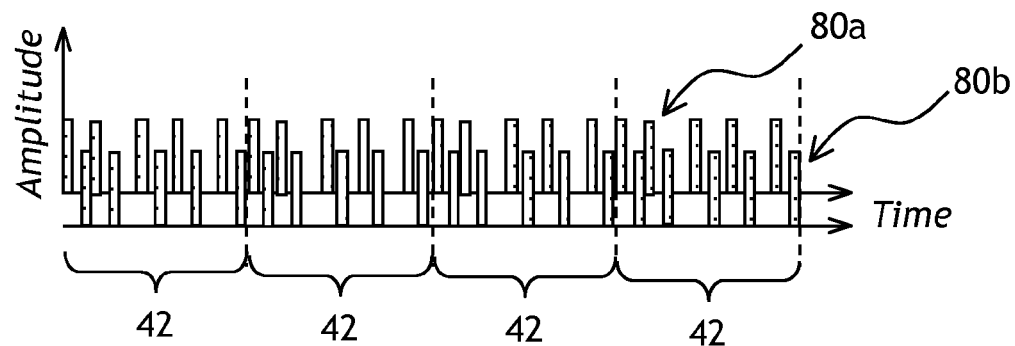
FIGS. 8A and 8B are time traces of binary driving pulses for driving two neighboring variable optical retarders of the array of FIG. 7 according to the invention, and a resulting TDM, respectively.
Figure 8B:
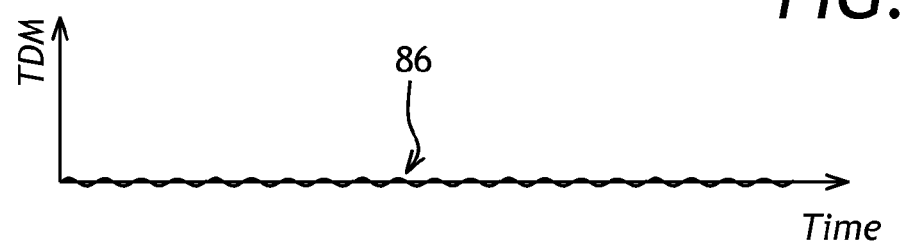

Referring now to FIG. 9 with further reference to FIGS. 7, 8A, and 8B, a method 90 (FIG. 9) of operating the array 74 is illustrated by way of an example of the first 74a and second 74b (FIG. 7) adjacent retarders of the array 74, illuminated by the incoming wavelength channel optical beam 76. In a step 91, first 80a and second 80b (FIG. 8A) temporal bit sequences of the equal total duration 42 are selected for application to the first 74a and second 74b retarders, respectively, for obtaining substantially equal the first 77a and the second 77b values of optical retardation in the first 74a and second 74b retarders, respectively. The first 77a and the second 77b values are equal because the saw tooth optical retardation pattern 77 is constant along the x-axis (FIG. 7). In a step 92, the first 80a and second 80b temporal bit sequences are simultaneously applied to the first 74a and second 74b retarders, to generate a spatial profile, in this example the saw tooth optical retardation pattern 77, in the incoming wavelength channel optical beam 76 illuminating the array 74 including the first 74a and the second 74b retarders, in response to net amplitudes of the first 80a and second 80b bit sequences, respectively. According to the invention, the one-bits in the first 80a and second 80b temporal bit sequences are substantially evenly distributed in time and are generally uncorrelated with each other.

The one-bits in the first 80a and second 80b temporal bit sequences are preferably non-periodic, that is, they lack a definite and recognizable order of bits. This results in lessening TDM 86 (FIG. 8B) of the reflected wavelength channel optical beam 78 coupled into the output port 72, for lessening the TDM of the reflected wavelength channel optical beam 78 coupled into the output port 72.

The term "generally uncorrelated" includes any bit patterns, in which the single-period sub-signals 50 generally do not align with each other, and preferably are spread out, so as not to occur at the same time, while lacking a definite or observable order. This can be achieved, for example, by taking a non-periodic bit sequence and selecting different start times of the non-periodic sequence to obtain the first 80a and second 80b temporal bit patterns. In other words, the first 80a and second 80b temporal bit patterns can be a same bit pattern but shifted in time, causing the individual single-period sub-signals (bits) 50 to be disordered or uncorrelated with each other, when the first 80a and second 80b temporal bit patterns are simultaneously applied to the first 74a and the second 74b retarders in the step 92. For example, the start time of the second sequence 80b can be shifted relative to the start time of the first sequence 80a not by one cycle as shown in FIG. 8A, but substantially by one half of the total bit sequence duration 42.

To apply different temporal bit patterns to the neighboring first and second retarders 74a and 74b having the same retardation value 77a, 77b, more than one temporal bit pattern can be allocated for this retardation value. When more than one temporal bit pattern is allocated, the temporal bit pattern may be randomly or pseudo-randomly selected in the first step 91 of the method 90 for at least one of the first and second retarders 74a and 74b.

The method 90 can be applied to the neighboring first 74a and third 74c pixels of the array having "adjacent" corresponding values of the first 77a and third 77c optical retardations, respectively. Herein, the term "adjacent retardation values" is to be understood in context of adjacent values of the saw tooth pattern 70, smoothly varying along the tooth length, that is, along the y-axis (FIG. 7).

Referring now to FIGS. 10A and 10b with further reference to FIGS. 7 and 9, a look-up table 100a of FIG. 10A or 100b of FIG. 10B can be used in the method 90 of FIG. 9 to store temporal bit sequences for each grayscale level attainable by the variable optical retarders, for example the first to third retarders 74a, 74b, 74c, of the array 74. In the tables 100a and 100b, the horizontal axis, or column number, represents a serial order of bits in bit sequences, and the vertical axis, or row number, represents a target retardation or grayscale level. Once the target retardation value for a retarder of the array 74 is known, the tables 100a and/or 100b can be consulted to extract a temporal bit sequence from a row corresponding to the target retardation value. The tables 100a and 100b are only examples; a look-up table of the invention can include more than one temporal bit pattern for each target retardation value, for driving neighboring retarders having a same target retardation value, for example the first and second retarders 74a and 74b as explained above. In another embodiment, the two look-up tables 100a and 100b are used in an alternate manner, for selecting temporal bit patterns for alternate consecutive pixels having a same target value of optical retardation.

Figure 10C:
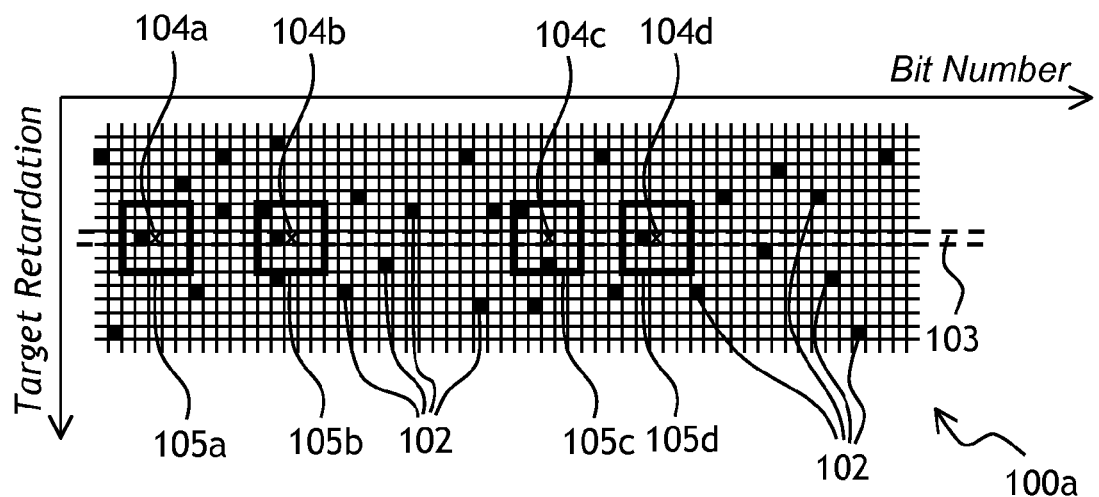
FIG. 10C is a portion of the look-up table of FIG. 10A showing a variation of a local bit density.

The tables 100a and 100b preferably have a local bit density that is substantially constant in horizontal direction, that is, along the bit number. Referring to FIG. 10C with further reference to FIG. 10A, the local bit density definition will be illustrated. In the table 100a of FIG. 10C, one-bits 102 are shown as black rectangles. By way of example, a particular row 103 of the table 100a includes bits 104a to 104d. Shown at 105a to 105d are 5×5 bit rectangles centered on the bits 104a to 104d, respectively. According to the invention, a total number of the one-bits 102 in the 5×5 bit rectangles 105a to 105d centered on the respective bits 104a to 104d of the particular row 103 of the look-up table 100a varies by X≤3 bits in going from one bit of the particular row 103, for example 104a, to another bit of the particular row 103, for example 104b or 104c or 104d. When this condition is fulfilled for at least Y=50% of all bits of the particular row 103, a TDM reduction can be observed. Preferably, Y≥80% of all bits of the particular row 103; and more preferably, X≤2 bits, for even stronger TDM reduction.

Turning now to FIG. 11 with further reference to FIGS. 7, 10A, 10B, and 10C, a method 110 of operating the array 74 of the WSS 70 of FIG. 7 includes a step 111 of defining a temporal bit pattern look-up table having at least one temporal bit sequence for each one of a plurality of pre-determined optical retardation values of an optical retarder e.g. 74a, 74b, or 74c of the array 74. For example, one of the look-up tables 100a and 100b of FIGS. 10A and 10B, respectively, can be used. In a step 112, target optical retardation values are determined for the optical retarders of the array 74 illuminated by the incoming wavelength channel optical beam 76 coupled to the input port 71. The target retardation values are selected for coupling the reflected wavelength channel optical beam 78 into the output port 72. In a step 113, the look-up table provided in the first step 111 is consulted to select the temporal bit sequences to be applied to the optical retarders e.g. 74a, 74b, or 74c of the array 74, to provide the target optical retardation values of the second step 112. Finally, in a step 114, the temporal bit sequences determined in the step 113 are simultaneously applied to the optical retarders e.g. 74a, 74b, or 74c of the array 74, so as to couple the reflected wavelength channel optical beam 78 into the output port 72. According to the invention, the one-bits 102 in the temporal bit sequences selected in step 113 are substantially evenly distributed in time and across the optical retarders e.g. 74a, 74b, or 74c of the array 74 illuminated by the wavelength channel optical beam 76, for lessening the TDM of the reflected wavelength channel optical beam 78 coupled into the output port 72. The one-bits in the selected temporal bit sequences are preferably disordered, that is, the corresponding temporal bit sequences are non-periodic with no observable order. It is also preferable that the total number of the one-bits 102 in the 5×5 bit rectangles 105a to 105d centered on the respective bits 104a to 104d of the particular row 103 varies by X≤3 bits for at least Y=50%, and more preferably for at least Y=80% of all bits of the particular row 103.

A plurality of alternative bit sequences can be provided for at least one of the plurality of pre-determined optical retardation values 77a, 77b, or 77c, so that in the selection step 113, one of the plurality of the alternative bit sequences is randomly or pseudo-randomly selected for the at least one optical retardation value. This can reduce periodicity of TDM. TDM aperiodicity is a desirable quality in optical networking applications where periodic modulation is applied to individual wavelength channel optical beams for wavelength channel identification purposes, because periodic TDM may interfere with wavelength channel identification. As noted above, the alternative bit sequences can be obtained from a same cyclic bit sequence with a shifted start time.

Figure 12:
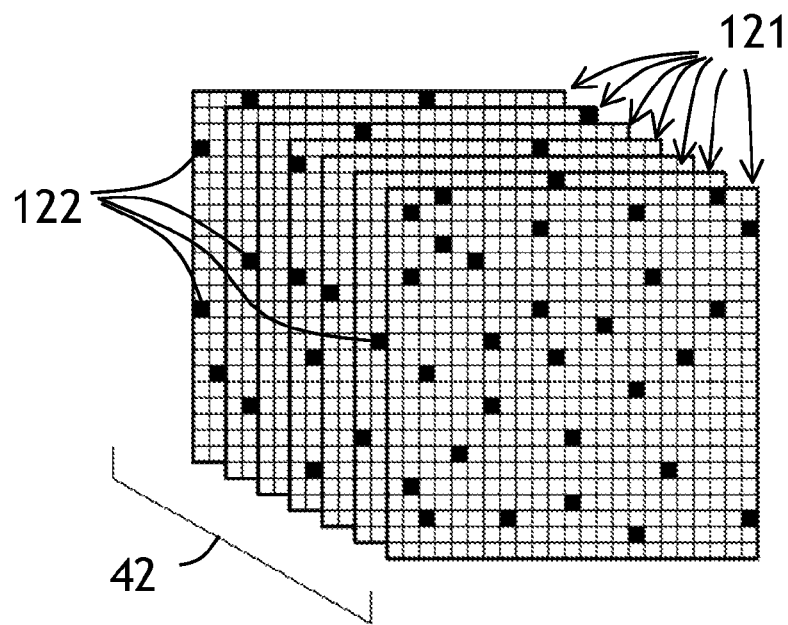
FIG. 12 is a schematic view of digital bit planes for digitally driving the array of FIG. 7 using one of the look-up tables of FIGS. 10A and 10B.

Referring to FIG. 12 with further reference to FIGS. 2, 7, 8A, 10A, 10B, and 11, the selected bit sequences can be applied in the step 114 of the method 110 by constructing a plurality of "bit planes" 121 for each modulation period or frame 42. Each of the bit planes 121 is a two-dimensional pattern of bits 122 applied to corresponding retarders of the array 74 during each clock cycle 44 of each modulation period 42 (FIG. 2). The bits 122 indicate one-bit. The number of bit planes is determined by the controller 75 (FIG. 7). In operation, the controller 75 reads the current look-up table, e.g. the look-up tables 100a or 100b of FIGS. 10A and 10B, constructs from the current look-up table a full set of the bit planes 121 for each modulation period 42, and sequences through the bit planes 121, whereby the temporal bit patterns e.g. 80a, 80b (FIG. 8A) are simultaneously applied to the corresponding retarders e.g. 74a, 74b, 74c of the array 74.

Temporal bit sequences look-up tables of the invention are preferably constructed so that probabilities of nth bit averaged over all temporal bit sequences of the look-up table to be a one bit are within 15% of each other, wherein n is a serial bit number in a temporal bit sequence of the look-up table. For example, bits of the look-up tables 100a or 100b of FIGS. 10A and 10B, respectively, are averaged to be within 11% and 2%, respectively. This "bit averaging" can facilitate a further TDM reduction.

Although a look-up table may be bit-averaged, one-bit probability in an actual drive signal may depend on the retardation values used to achieve a particular level of attenuation of the reflected wavelength channel optical beam 78 coupled into the output port 72 (FIG. 7). Turning now to FIGS. 13, 14A, and 14B with further reference to FIGS. 7, 10A, and 10B, when the reflected wavelength channel optical beam 78 is coupled into the output port 72 (FIG. 7) with a minimal loss, the used percentages of the retardation values from 1 to 256 units are uniform as indicated by a graph 130 of FIG. 13. At this condition, the look-up tables 100a and 100b of FIGS. 10A and 10B provide more or less uniform bit probability distributions 140a of FIG. 14A and 140b of FIG. 14B, respectively, with an exception of a bump 141 in the bit probability distribution 140a of FIG. 14A. When, however, the reflected wavelength channel optical beam 78 is coupled into the output port 72 (FIG. 7) with a target loss of 6 dB, the used percentages of the retardation values from 1 to 256 units are not uniform, because only first 60 retardation values are used to create this target loss, as indicated by a graph 150 of FIG. 15. At this condition, the look-up tables 100a and 100b of FIGS. 10A and 10B may provide non-uniform bit probability distributions 160a of FIG. 14A and 160b of FIG. 16B. Bit averaging over subsets of the temporal bit sequences, e.g. the first 25%, second 25%, third 25%, and fourth 25% of the retardation values of the look-up tables, may be employed to further adjust TDM as required by the WSS 70 performance specification.

To obtain the target attenuation of 6 dB, not only the first 60 retardation values, but also the last 60 retardation values of the look-up tables 100a and 100b of FIGS. 10A and 10B could be used to achieve the same angle of steering of the reflected wavelength channel optical beam 78. The first 60 retardation values are preferable since the response time of most liquid crystal fluids decreases with the applied voltage, and the last 60 retardation values correspond to the higher voltage; thus, TDM may be reduced by selecting the retardation values from the first part of the table. Of course, this technique can be applied at any other level of attenuation. Generally, in situations when optical retardation values increase substantially linearly across the array 74 as shown in FIG. 7, the optical retardation values can be selected so as to correspond to a lower voltage across the optical retarders of the array 74, for TDM reduction.

Figure 17:
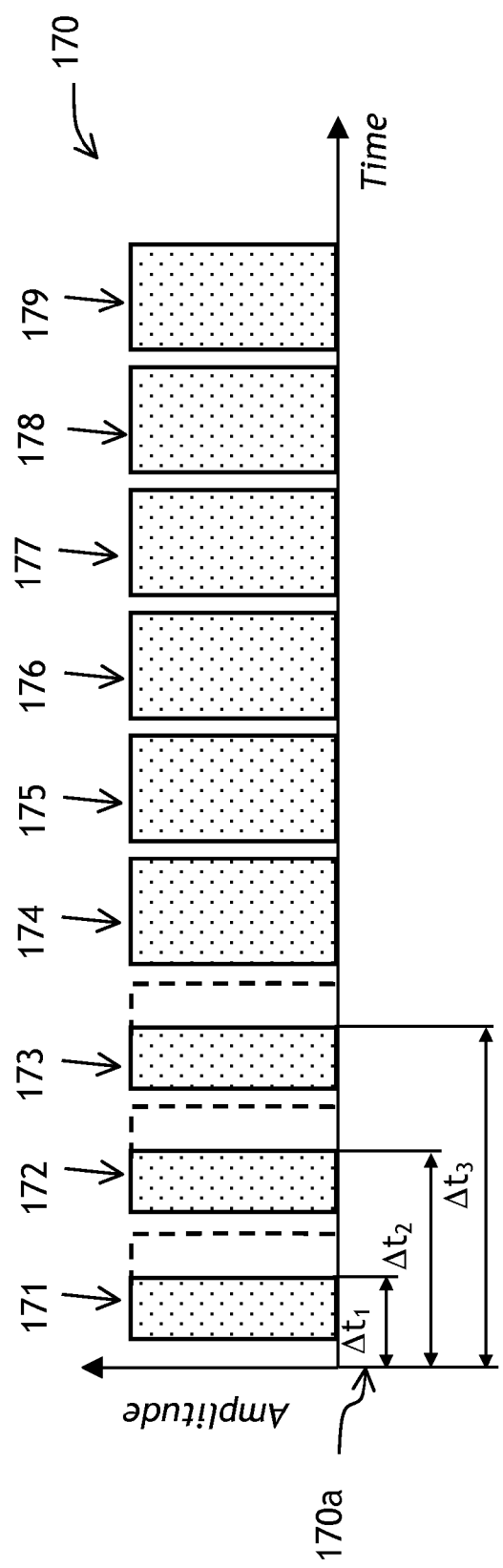
FIG. 17 is a time trace of a binary driving voltage having "fractional bits"

In one embodiment of the invention, a bit duration of at least one bit in temporal bit sequences can be varied to increase the number of attainable values of optical retardation, or grayscale levels. Turning to FIG. 17 with further reference to FIGS. 7, 10A, and 10B, a bit sequence 170 has 9 bits 171 to 179. First three bits 171, 172, and 173 of the bit sequence 170 have shortened, individually adjustable bit durations. The bit durations are shortened by switching off the backplane voltage of the array 74 at predetermined time intervals $\Delta t_1$, $\Delta t_2$, and $\Delta t_3$ from a frame (modulation period) start 170a. The bits with shortened bit duration are termed herein "fractional bits". A fractional bit sequence 101, including the three bits 171, 172, and 173 of the bit sequence 170, is seen as a repeating bit pattern on the left-hand side of the look-up tables 100a and 100b of FIGS. 10A and 10B, respectively.

Figure 18:
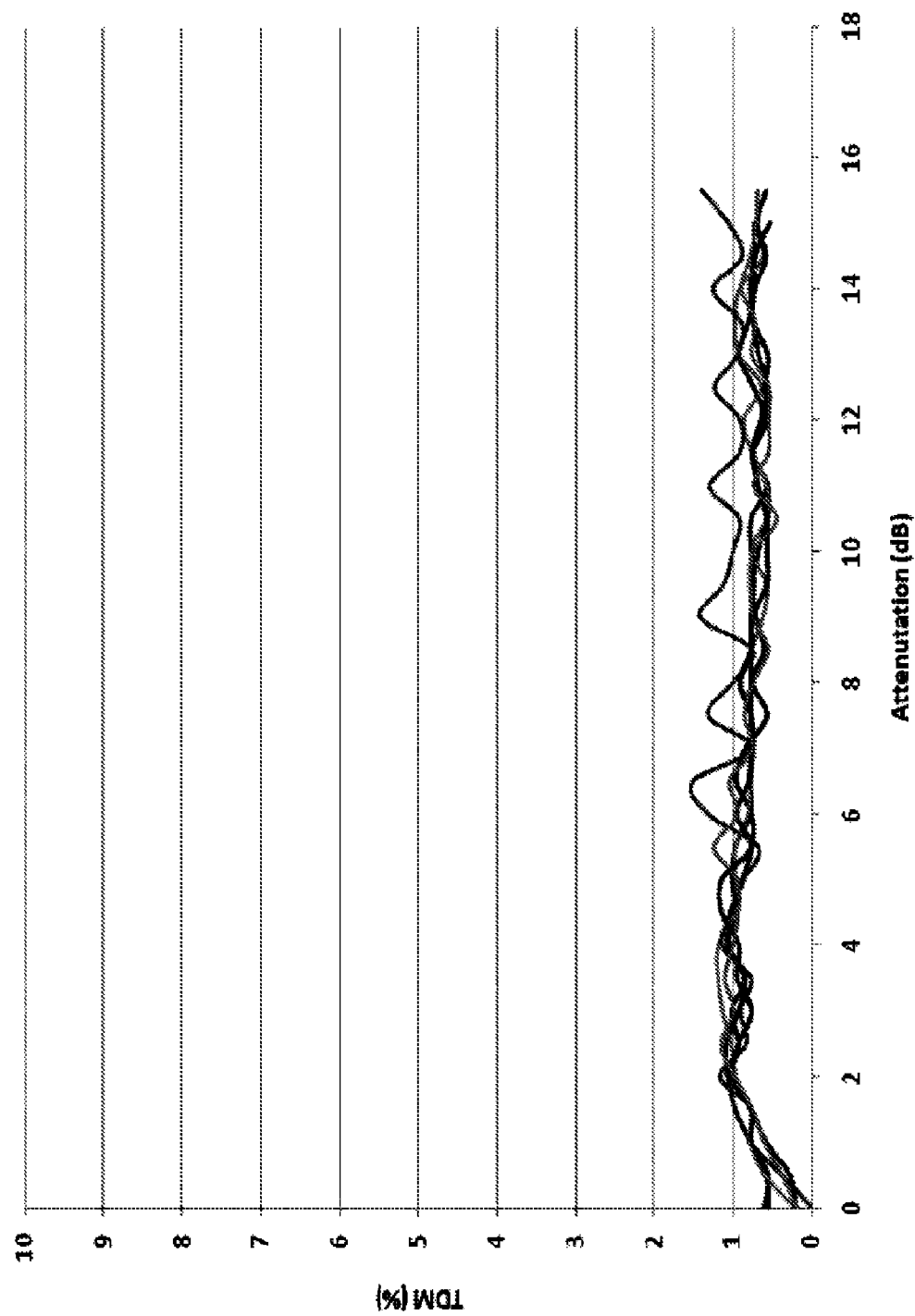
FIG. 18 is a plot of measured TDM vs. attenuation in the WSS of FIG. 7, using an operating method of FIG. 11.
Figure 19:
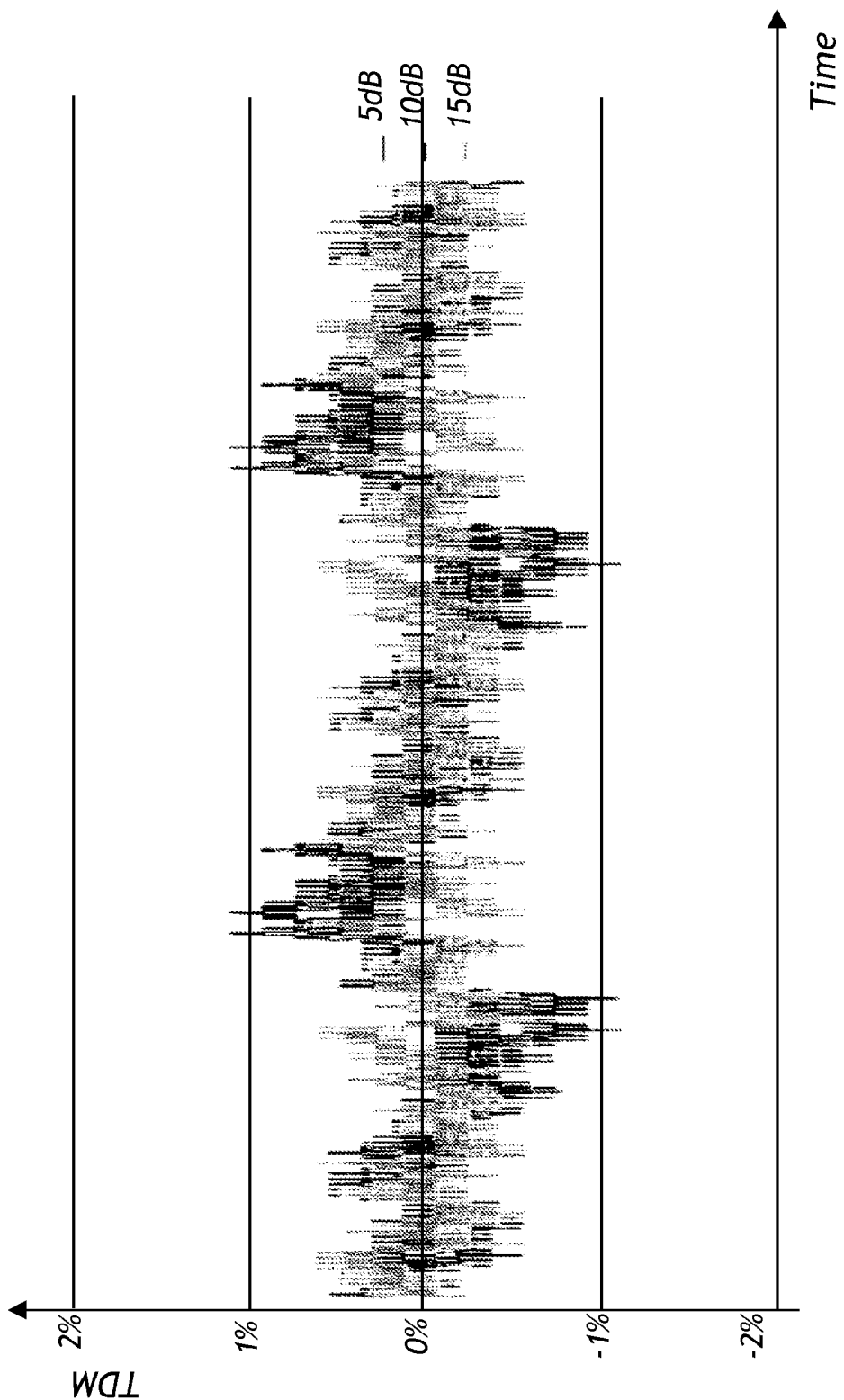
FIG. 19 is a time trace of measured TDM at the attenuation levels of 5 dB, 10 dB, and 15 dB.

Referring now to FIG. 18 with further reference to FIGS. 7, 9, and 11, a resulting TDM is shown as a function of attenuation of the reflected wavelength channel optical beam 78 coupled into the output port 72 of the WSS 70. In FIG. 19, a TDM with an amplitude of about 1% has been measured as a function of time for the attenuation levels of 5 dB, 10 dB, and 15 dB using methods 90 (FIG. 9) and 110 (FIG. 11) of the invention. It is seen that at attenuation levels of over 15 dB, a TDM of well under 2% is achieved. The methods 90 (FIG. 9) and 110 (FIG. 11) and their variants as herein described can be suitably programmed into the controller 75 of the WSS 70.

In one embodiment of the invention, individual bit durations are adjusted while measuring the TDM of the reflected wavelength channel optical beam 78 coupled into the output port 72 of the WSS 70, to find bit durations that result in a reduced TDM. For example, the time intervals $\Delta t_1$, $\Delta t_2$, and $\Delta t_3$ of the fractional bits 171, 172, and 173 of FIG. 17 may be individually adjusted.

The above-described embodiments of the present invention can be implemented in any of numerous ways. For example, the modules of the controller 75 may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Generally, a processor may be implemented using circuitry in any suitable format. It is to be understood that the arrays of variable optical retarders and their method of operations described herein can be used not only in WSS but in any optical devices where an optical beam is switched between an input port and an output port, such as optical switches, variable optical attenuators, gain equalizers, and the like.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
    selecting temporal bit sequences from a group of temporal bit sequences,
    wherein the group of temporal bit sequences includes temporal bit sequences having substantially uncorrelated bit patterns; and
    applying the selected temporal bit sequences to respective variable optical retarders to generate a pattern for the respective variable optical retarders to receive a beam of light,
    wherein the substantially uncorrelated bit patterns applied to the respective variable optical retarders reduce an amplitude and a coherence of fluctuations in the pattern.

2. The method of claim 1, wherein the substantially uncorrelated bit patterns are bit patterns in which single-period sub-signals are not aligned.

3. The method of claim 1, wherein one-bits in the selected temporal bit sequences are non-periodic.

4. The method of claim 1, wherein one-bits in the selected temporal bit sequences are substantially evenly distributed in time.

5. The method of claim 1, wherein selecting the temporal bit sequences includes:
    selecting, using a look-up table having a plurality of rows that each contains a temporal bit sequence for one of a plurality of optical retardation values, the temporal bit sequences.

6. The method of claim 1, wherein the selected temporal bit sequences are of equal total duration.

7. The method of claim 1, wherein the selected temporal bit sequences are simultaneously applied to the respective variable optical retarders.

8. The method of claim 7, wherein simultaneously applying the selected temporal bit sequences generates a spatial profile in the beam of light.

9. The method of claim 1, further comprising:
    determining respective optical retardation values for the respective variable optical retarders,
    wherein the selected temporal bit sequences are selected based on the determined respective optical retardation values.

10. The method of claim 1, further comprising:
    adjusting a bit duration of at least one bit in the selected temporal bit sequences to lessen a time-domain modulation.

11. A controller configured to:
    select temporal bit sequences from a group of temporal bit sequences,
    wherein the group of temporal bit sequences includes temporal bit sequences having substantially uncorrelated bit patterns; and
    apply the selected temporal bit sequences to respective variable optical retarders to generate a pattern for the respective variable optical retarders to receive a beam of light,
    wherein the substantially uncorrelated bit patterns applied to the respective variable optical retarders reduce an amplitude and a coherence of fluctuations in the pattern.

12. The controller of claim 11, wherein the substantially uncorrelated bit patterns are bit patterns in which single-period sub-signals are not aligned.

13. The controller of claim 11, wherein one-bits in the selected temporal bit sequences are non-periodic.

14. The controller of claim 11, wherein one-bits in the selected temporal bit sequences are substantially evenly distributed in time.

15. The controller of claim 11, wherein the controller, when selecting the temporal bit sequences, is configured to:
    select, using a look-up table having a plurality of rows that each contains a temporal bit sequence for one of a plurality of optical retardation values, the temporal bit sequences.

16. The controller of claim 11, wherein the selected temporal bit sequences are of equal total duration.

17. The controller of claim 11, wherein the selected temporal bit sequences are simultaneously applied to the respective variable optical retarders.

18. The controller of claim 17, wherein simultaneously applying the selected temporal bit sequences generates a spatial profile in the beam of light.

19. The controller of claim 11, wherein the controller is further configured to:
    determine respective optical retardation values for the respective variable optical retarders,
    wherein the selected temporal bit sequences are selected based on the determined respective optical retardation values.

20. The controller of claim 11, wherein the controller is further configured to:
    adjust a bit duration of at least one bit in the selected temporal bit sequences to lessen a time-domain modulation.

* * * * *